3,264,146
ORGANIC FLUX COMPOSITIONS AND
METHOD OF USING SAME
Burton S. Marks, Palo Alto, Calif., assignor to Continental Can Company, Inc., New York, N.Y., a corporation of New York
No Drawing. Filed Sept. 10, 1965, Ser. No. 486,540
14 Claims. (Cl. 148—23)

This application is a continuation-in-part of my application Serial No. 165,674, filed January 11, 1962, for "Organic Flux for Soldering."

This invention is directed to soldering flux compositions and more specifically to the method of using said compositions for soldering tinplate and similar metal containers. Presently, it is known to employ various compositions including rosin and other heat-decomposable salts comprising zinc and ammonia chlorides for soldering. These compositions are known to prepare the surface of the metal to enable the molten solder to form a firm bond. In practice, however, a number of the known fluxes, including the rosin fluxes, for example, decompose at soldering temperatures and leave an undesirable deposit. Similarly, the chloride-containing fluxes are so strongly acidic that at soldering temperatures the chlorides extend beyond the region to be soldered and remain on the metal surface after the soldered area cools.

Normally, the solder employed with tinplate in preparing food containers, e.g., lead-tin solder having a ratio of 98 to 2, melts at about 320° C. At this temperature, the fluxes of the present invention are able to withstand the heat without significantly decomposing and are effective for removing tin oxide as it forms on the metal surface. Although stannous oxide (SnO) is amphoteric in nature, it is somewhat more basic than it is acidic in its chemical reactivity and, therefore, more readily reacts with the non-oxidizing acid to form the corresponding stannous salts which are soluble in the acid flux. Accordingly, it has been found that in soldering metal and particularly tinplate, a specific group of organic acid compounds may be used as a soldering flux without many of the disadvantages of the fluxes used heretofore.

Thus, it is an object of this invention to provide a method of soldering by utilizing an organic acid compound which is substantially stable or will not decompose at soldering temperatures.

It is another object of this invention to provide an organic fluxing composition which is reactive with stannous oxide at soldering temperatures.

It is still another object of this invention to provide a method of soldering tinplate by utilizing a non-oxidizing acidic compound which is substantially stable at soldering temperatures and which does not leave a residue on the soldered surface.

These and other objects of the invention will become apparent from a further and more detailed description as follows:

It has been found that improved soldering can be obtained particularly for tinplate by utilizing certain organic acid compounds capable of wetting the metal surface and thereby maintaining a film which enables the molten solder to come into contact with a clean metal surface to form a firm bond. The organic acid compounds to be utilized in the soldering process of this invention comprise trimellitic acid, the anhydrides and esters thereof, the polycarboxylic acids and the anhydrides thereof, and the aromatic acidic compounds.

It has been found that of the many known acidic compounds, trimellitic acid, its anhydrides or esters provide a good fluxing reagent which is liquid at soldering temperatures, i.e., around 320° C., and is essentially non-oxidizing to the extent that they will not attack the metal surface. More specifically, the trimellitic acid compounds are effective to displace and remove surface contaminants, i.e., tin oxides and chromates, as well as lubricating residues, and are capable of wetting the metal surface without any preliminary treatment thereof. The acid as such may be used as a fluxing agent, since it forms the anhydride at temperatures of about 216° C., as illustrated below.

(I) 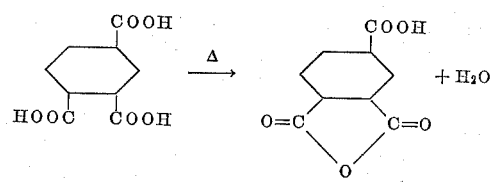

In addition to the acid and the anhydrides, the esters of trimellitic acid which may be prepared from anhydride by refluxing with the desired alcohol have been found to be effective. The monoesters of trimellitic acid, for example, may be characterized as a mixture of the following:

(II) 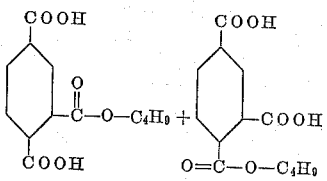

In general, the esters of the acid are prepared by utilizing aliphatic alcohols containing 2 to 6 carbon atoms and include the monoesters prepared from butyl alcohol, propyl alcohol, etc. In addition, the diesters may be prepared and used for purposes of this invention by the reaction of the anhydride of trimellitic acid with various glycols which contain from 2 to 4 carbon atoms, such as ethylene glycol, diethylene glycol, propylene glycol, etc. These polyesters may be characterized by the following formulas:

(III) 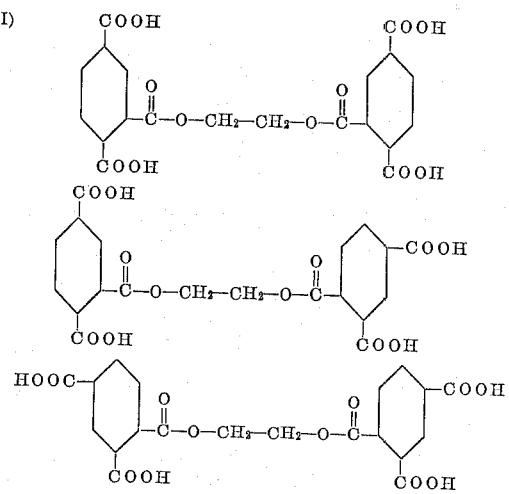

In addition to the trimellitic acid compounds, saturated aliphatic polycarboxylic acids, and more specifically the dicarboxylic acids and their anhydrides, may be used and include such compounds as sebacic and azelaic acids and the anhydrides thereof. These polycarboxylic acids may have linear or branched structures and are characterized as having 9 to 10 carbon atoms per molecule with at least two carboxyl groups wherein said carboxyl groups are separated by at least four carbon atoms. Typical examples of the carboxylic acids include 2-ethyl suberic acid, 2,5-diethyl adipic acid, isosebacic acid, etc. These acids may be characterized by the following structural formulas:

n-Sebacic acid

HOOC·(CH₂)₈·COOH 2-ethyl suberic acid

HOOC—CH—(CH₂)₅·COOH
         |
         C₂H₅

2,5-diethyl adipic acid

HOOC·CH·(CH₂)₂·CH·COOH
     |            |
     C₂H₅        C₂H₅

Azelaic acid

HOOC·(CH₂)₇·COOH

Polysebacic anhydride $$H \left[ O-\overset{O}{\underset{\|}{C}}(CH_2)_8 \cdot \overset{O}{\underset{\|}{C}} \right]_x OH$$

Upon heating these carboxylic acid compounds, there is no formation of substantial amounts of cyclic or mono-anhydrides formed but two or more of these acid molecules may combine to form linear polyanhydrides. When the acid contains carboxyl groups separated by three or less carbon atoms, the application of heat may cause a single acid molecule to form the mono-anhydride with the remaining of the molecule forming a cyclic or ring structure. Thus, to avoid this, it is preferred to use polycarboxylic acids having 9 or 10 carbon atoms per molecule.

In addition to the trimellitic acid compounds and the polycarboxylic acid compounds, the aromatic acid compounds which may be employed include the polyhydroxy-benzophenones. These are di-nuclear phenols wherein the nuclei are connected by a carbonyl group which is in the ortho position with respect to at least one of the phenolic hydroxyl groups. Typical examples of the hydroxybenzophenone include the following:

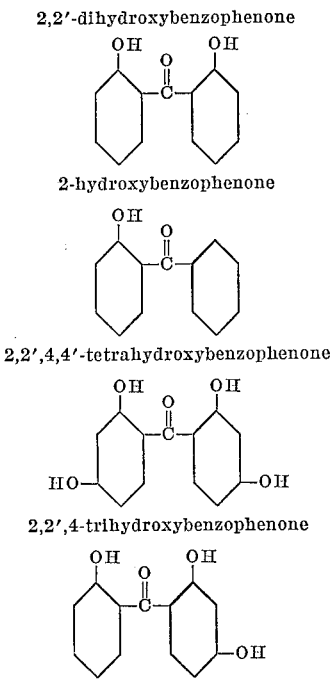

2,2′-dihydroxybenzophenone 2-hydroxybenzophenone 2,2′,4,4′-tetrahydroxybenzophenone 2,2′,4-trihydroxybenzophenone Each of the above-mentioned acidic compounds, including the trimellitic acid compounds, the polycarboxylic acid compounds and the hydroxybenzophenones, are liquid at soldering temperatures of about 320° C. and are capable of wetting the metal surface so as to effectively displace or remove any surface impurities without forming undesirable residues. These compounds have been successfully employed as fluxes under can soldering line conditions wherein the flux was applied to the container hook area and the container body preheated to temperatures of about 320° F. for a few seconds prior to applying the solder. The soldering was accomplished by utilizing soldering rolls which took solder from a pot having a temperature of above 680–700° F. and subsequently delivered same to the body seam. The particular solder employed included a 98:2 ratio of lead and tin which had a melting point above 600° F. These solders have been found particularly useful in the can-making industry in that they resist creep or cold flow during processing, e.g., in packing beer, in comparison to other known solders having a higher tin content.

The acidic compounds may be further modified by incorporating therewith a monoethanolamine hydrochloride in an amount ranging from about 2 to 50% by weight of the acidic compound.

In many instances it is preferred to utilize the acidic compound as a solution in a volatile organic solvent. In general, polar solvents are desirable to assure the complete solubility of the acidic compound and the ethanolamine hydrochloride and include such organic solvents as dimethylacetamide, methyl cellosolve, ethyl butyl ketone, amyl acetate, cellosolve acetate, diacetone alcohol, methyl amyl acetate, carbitol, etc.

A typical example to illustrate a soldering composition is as follows:

*Example I*

| | Parts by weight |
|---|---|
| Dimethylformamide | 75 |
| Sebacic acid | 25 |
| Monoethanolamine hydrochloride | 1.2 |

*Example II*

| | Parts by weight |
|---|---|
| Dimethylformamide | 75 |
| Trimellitic acid | 25 |

While the addition of the monoethanolamine hydrochloride is helpful in some instances for soldering, it is, however, not ciritical in that organic solutions of the organic acid compounds of this invention may be utilized with complete satisfaction. Thus, any of the known organic solvents may be used in combination with the acidic acid compounds, i.e., trimellitic acid, to form a useful soldering composition, particularly in soldering tinplate.

While this invention has been described with specific embodiments, it is obvious that other modifications and variations may be utilized without departing from the spirit of the invention, except as more particularly pointed out in the appended claims.

I claim:
1. In a method of soldering metal, the step which comprises applying thereon an effective amount of a soldering flux selected from the group consisting of the saturated aliphatic polycarboxylic acids and their anhydrides having 9 to 10 carbon atoms with at least 4 carbon atoms between the carboxyl groups, trimellitic acid and the anhydrides and esters thereof, and the hydroxybenzophenones.
2. The method of claim 1 further characterized in that the soldering flux is a trimellitic acid compound.
3. The method of claim 2 further characterized in that the trimellitic acid compound is an ester of trimellitic acid.
4. The method of claim 3 further characterized in that the soldering flux is an ester of trimellitic acid prepared from aliphatic alcohols and glycols.
5. The method of claim 1 further characterized in that the soldering flux is an anhydride of the dicarboxylic acids.
6. The method of claim 1 further characterized in that the soldering flux is a hydroxybenzophenone.
7. The method of claim 6 further characterized in that the hydroxybenzophenone is 2,2′-dihydroxybenzophenone.

8. The method of claim 6 further charatcerized in that the hydroxybenzophenone is 2,2',4-trihydroxybenzophenone.

9. In a method of soldering metal, the step which comprises adding thereon an effective amount of a soldering composition consisting essentially of a volatile organic solvent having solubilized therein a soldering flux selected from the group consisting of saturated aliphatic dicarboxylic acids and the anhydrides thereof having 9 to 10 carbon atoms with at least 4 carbon atoms between the carboxyl groups, trimellitic acid and the anhydrides and esters thereof, and the hydroxybenzophenones.

10. The method of claim 9 further characterized in that the volatile organic solvent is dimethylformamide.

11. The method of claim 9 further characterized in that the flux is a trimellitic acid ester wherein the acid was esterified with an aliphatic alcohol containing 2 to 6 carbon atoms per molecule.

12. The method of claim 9 further characterized in that the flux is an ester of trimellitic acid wherein the acid was esterified with a glycol having 2 to 4 carbon atoms per molecule.

13. The method of claim 9 futrher characterized in that the flux is a dicarboxylic acid.

14. The method of claim 9 further characterized in that the flux is a hydroxybenzophenone.

References Cited by the Examiner
UNITED STATES PATENTS

| | | | |
|---|---|---|---|
| 1,785,134 | 12/1930 | McQuaid | 148—23 |
| 1,949,916 | 3/1934 | McQuaid | 148—23 |
| 2,563,391 | 8/1951 | Browne | 148—23 |
| 2,659,684 | 11/1953 | Neish | 148—23 |

DAVID L. RECK, *Primary Examiner.*

H. F. SAITO, *Assistant Examiner.*